Aug. 14, 1928.                                         1,680,503
J. M. CURLEE
COMBINED SPEEDOMETER AND MOTOMETER
Filed April 20, 1925
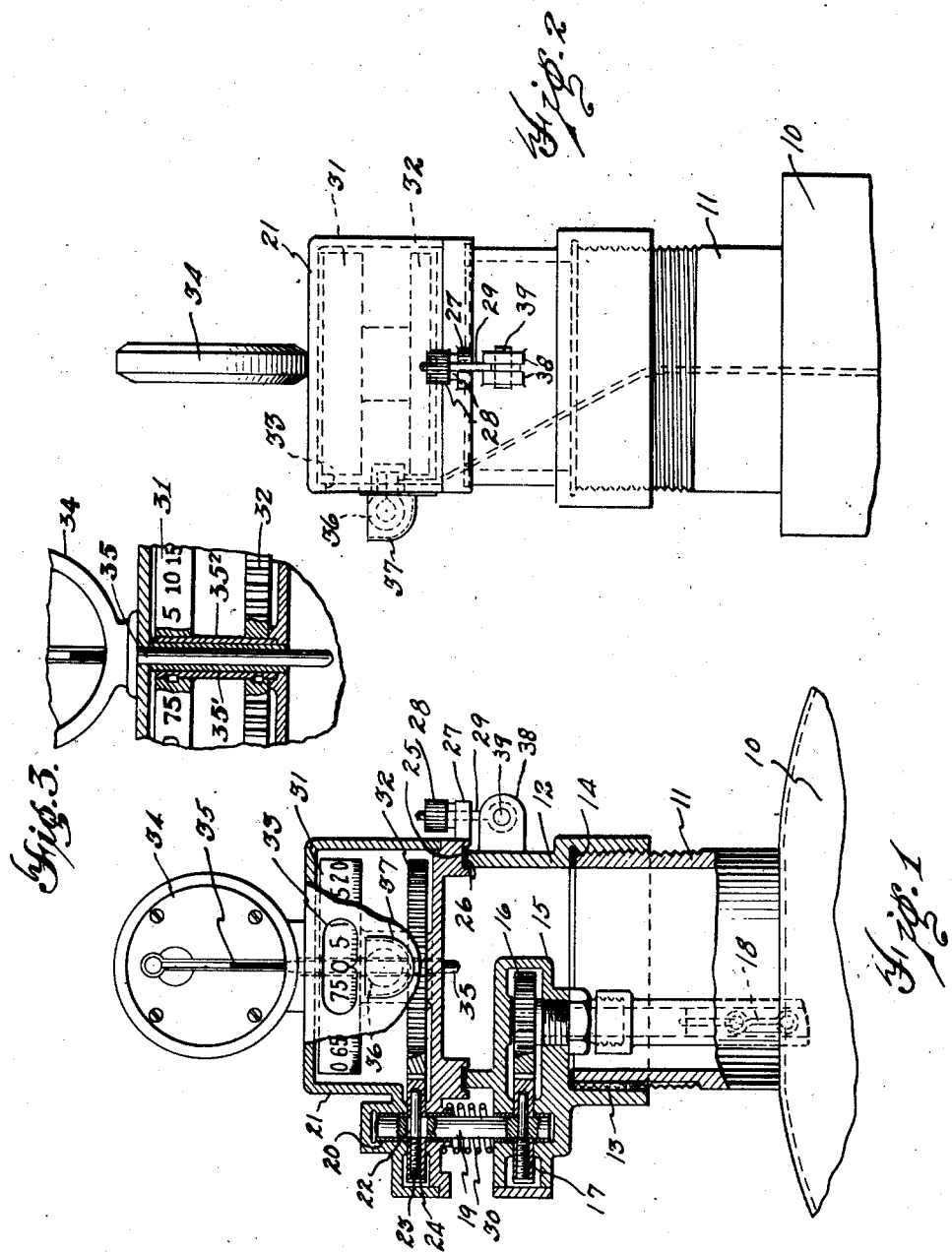
INVENTOR.
John M. Curlee
BY
ATTORNEYS Patented Aug. 14, 1928.

1,680,503

UNITED STATES PATENT OFFICE.

JOHN M. CURLEE, OF KIRKWOOD, MISSOURI.

COMBINED SPEEDOMETER AND MOTOMETER.

Application filed April 20, 1925. Serial No. 24,642.

The invention relates to motor vehicle accessories, attachments, and the like and has among its objects to provide a combined motometer and speedometer indicating construction. A further feature resides in the provision of a simply constructed attachment for motor vehicle radiators including a speedometer, indicating mechanism and motometer. Other features lie in so positioning a speedometer indicator that the same may be viewed by the driver of the car without taking his eyes from the road, also the provision of illuminating means for rendering the speedometer indicator and motometer readily visible at night.

With these and other objects in view, the invention resides in the novel features of construction and combination and arrangements of parts as more fully hereinafter described and claimed.

Referring to the drawings:—

Figure 1 is an elevation view partly in section showing my combined speedometer and motometer, and Figure 2 is a side view of the same.

Figure 3 is a fragmentary view of the cap showing the arrangement of the motometer tube and the speedometer indicator.

In the drawings, reference character 10 indicates a motor vehicle radiator which may be of usual construction having the threaded filler neck 11. 12 is a fitting threaded for engagement with the filler neck 11 and may be locked in position by a pin 13 driven longitudinally of the inter-engaging threads. A suitable packing 14 of cork or other material may be employed to afford a resilient seal. The fitting 12 is provided with a gear housing 15 in which are mounted gears 16 and 17. The gear 16 is actuated by a cable or the like 18 which is connected with the usual speedometer mechanism (not shown) positioned adjacent the front wheel of the vehicle, or transmission or other suitable point for operating the cable 18 to indicate the speed of travel of the vehicle. The gear 17 is mounted on the vertical shaft 19, the upper end of which has a bearing 20 in the cap member 21. The shaft 19 is provided with a transverse slot 22 through which extends a pin 23 carried by a gear 24 adapted to be driven by the vertical shaft 19. The slot 22 extends longitudinally of the shaft a distance sufficient to permit the cap 21 to be raised sufficient to permit turning as will be readily understood.

The cap 21 is preferably provided with an annular groove 25 for receiving a suitable packing 26 to afford a resilient seal with the fitting 12. For detachably securing the cap 21 upon its seat provided by the fitting 12, a clamp device 27 may be provided consisting of a bifurcated lug 27 carried by the cap 21 the clamp nut 28 and the screw 29, The latter is provided with an enlarged portion at its lower end having a hole extending therethrough. The fitting 12 carries a pair of spaced lugs 38 apertured to receive a pin 39. The screw 29 is pivotally held between lugs 38 by pin 39 passing through the hole in the enlarged portion thereof. In clamping position screw 29 is swung upwardly to pass through the bifurcated portion of lug 27, and nut 28 is threaded onto the screw 29 until it rests tightly upon the lug 27.

A spring 30 may be located around shaft 19 and tends to separate the cap 21 and fitting 12 whereby lateral swinging of the cap after release of the clamp 27 is facilitated.

Within the cap 21 a speedometer indicator 31 is rotatably mounted and is provided with the usual operating mechanism which is adapted to be actuated by a gear 32 meshing with the gear 24. An opening 33 in the rear of the cap affords a view of the speedometer in the direct line of vision of the operator of the car.

Mounted upon the cap 21 is a motometer 34 which may be of the usual construction, the temperature indicator 35 thereof preferably being substantially in alignment with the opening 33 for viewing the speedometer indicator. For permitting this arrangement the thermometer tube of the temperature indicator 35 is supported within a tubular member 35′ upon which a hollow shaft $35^2$ is rotatably mounted, this shaft carrying the speedometer indicator 31 and the gear 32. Thus, the operator of the car may view the speedometer indicator and motometer without turning his eyes from the road ahead of him.

For readily viewing both the speedometer indicator and the motometer at night, I may provide an electric bulb 36 backed by a reflector 37 for directing the rays of light upwardly against the indicator and motometer.

When it is desired to remove the cap from the radiator temporarily, as for filling the radiator, the clamping device 27 is released and the cap swung free of the filler neck, the shaft 19 affording pivotal bearing.

With the parts assembled as shown in the drawings, it will be readily apparent that I have provided a speedometer indicator mounting whereby the driver of the motor vehicle may readily view the same, day or night, without shifting his normal line or vision on the road ahead of him. Furthermore, the invention affords a unitary construction in the form of a radiator attachment including a combined speedometer indicator and motometer, the construction being simple and affording manufacture and assembly of the parts at a low cost.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. An attachment for a motor vehicle radiator having a filler neck, said attachment consisting of a fitting engageable with the filler neck, a speedometer indicator supported by the fitting and a motometer also included in the attachment and supported by the fitting, said speedometer indicator and motometer being thus located at substantially the same point for simultaneous observation.

2. An attachment for a motor vehicle radiator having a filler neck, said attachment comprising a fitting engageable with said filler neck, and a speedometer indicator carried by the fitting and positioned substantially in the normal line or vision of the operator of the motor vehicle, and a motometer also supported by said fitting and substantially in the same line of vision as that aforesaid.

3. An attachment for a motor vehicle radiator having a filler neck comprising, a fitting engageable with the filler neck, a cap pivoted to the fitting so as to swing free thereof at times, a speedometer indicator housed by the cap means for actuating said indicator, and a motometer mounted above the cap and carried thereby, said speedometer indicator and motometer being positioned closely adjacent to each other and in a common point of observation.

4. An attachment for a motor vehicle radiator having a filler neck comprising, a fitting engageable with the filler neck, a speedometer indicator carried by said fitting, means for actuating the speedometer indicator, a motometer mounted above the speedometer indicator and forming therewith a unitary construction located in the normal range of vision of the operator of the vehicle, and illuminating means for said speedometer indicator and for said motometer rendering them visible at night.

5. An attachment for a motor vehicle radiator having a filler neck, said attachment comprising a fitting engageable with said filler neck, means carried by said fitting for indicating the speed of the motor vehicle, and actuating means for said indicator including gearing carried by said fitting.

6. An attachment for a motor vehicle radiator having a filler neck, said attachment comprising a fitting engageable with said filler neck, means carried by said fitting and positioned substantially in the normal line of vision of the operator of the motor vehicle for indicating the speed of the vehicle, and actuating means for said indicator including gearing mounted on said fitting, and a driving cable having one end thereof positioned within the filler neck and connected to said gearing.

7. An attachment for a motor vehicle radiator having a filler neck, said attachment comprising a fitting engageable with said filler neck, a cap pivoted to the fitting, a speedometer indicator housed within the cap, and means for actuating said indicator.

8. An attachment for a motor vehicle radiator having a filler neck, said attachment comprising a fitting engageable with said filler neck, a cap pivoted to the fitting so as to swing free thereof at times, a speedometer indicator housed by the cap in the normal line of vision of the operator of the vehicle, and means for actuating said indicator.

9. In combination with a motor vehicle radiator having a filler neck, a fitting engageable with the filler neck, a speedometer indicator carried by said fitting, means for actuating said indicator, and illuminating means for said indicator carried by said fitting.

10. In combination with a motor vehicle radiator having a filler neck, a fitting engageable with the filler neck provided with an opening therethrough, a speedometer indicator carried by said fitting in alignment with the opening in said fitting, means for actuating said indicator, and illuminating means carried by said fitting adjacent said opening for rendering the indicator visible at night.

11. In combination with a motor vehicle radiator having a filler neck, a fitting engageable with the filler neck, a cap, gearing carried by the fitting, gearing carried by the cap, a shaft forming a driving connection between the gearing of said fitting and said cap, a speedometer indicator housed within said cap and adapted to be actuated by said cap gearing, and means for driving the fitting gearing.

12. In combination with a motor vehicle radiator having a filler neck, a fitting engageable with the filler neck, a cap, gearing carried by the fitting, gearing carried by the cap, a shaft forming a driving connection between the gearing of said fitting and said cap, a speedometer indicator housed within said cap and adapted to be actuated by said cap gearing, and means for driving the fitting gearing, said shaft forming a pivotal connection between said cap and fitting whereby a swinging movement of the cap is permitted.

13. In combination with a motor vehicle radiator having a filler neck, a fitting engageable with the filler neck, a cap, a shaft having its opposite ends journalled in said fitting and cap and constituting a pivotal connection therebetween, gearing carried by said fitting and cap respectively mounted upon opposite ends of said shaft, a speedometer indicator adapted to be actuated by said cap gearing, and means for driving said fitting gearing.

14. An attachment for a motor vehicle radiator having a filler neck, said attachment comprising a fitting engageable with said filler neck, a cap mounted on the fitting, a speedometer indicator housed within said cap, a motometer mounted on said cap above said speedometer indicator, and means for actuating said indicator.

In testimony whereof I affix my signature.

JOHN M. CURLEE.